(12) United States Patent
Wentz et al.

(10) Patent No.: US 11,757,658 B2
(45) Date of Patent: *Sep. 12, 2023

(54) METHODS AND SYSTEMS FOR IMPLEMENTING MIXED PROTOCOL CERTIFICATES

(71) Applicant: Ares Technologies, Inc., Boston, MA (US)

(72) Inventors: Christian T. Wentz, San Francisco, CA (US); Mira Belenkiy, Sharon, MA (US); Anna Lysyanskaya, Providence, RI (US); Ilia Lebedev, Cambridge, MA (US)

(73) Assignee: Ares Technologies, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,946

(22) Filed: Mar. 21, 2022

(65) Prior Publication Data

US 2022/0337432 A1    Oct. 20, 2022

Related U.S. Application Data

(63) Continuation of application No. 16/828,358, filed on Mar. 24, 2020, now Pat. No. 11,374,771, which is a (Continued)

(51) Int. Cl.
*H04L 9/32* (2006.01)
*H04L 9/30* (2006.01)

(52) U.S. Cl.
CPC .......... *H04L 9/3263* (2013.01); *H04L 9/3073* (2013.01); *H04L 9/3247* (2013.01)

(58) Field of Classification Search
CPC ... H04L 9/3263; H04L 9/3073; H04L 9/3247; H04L 2209/42; H04L 9/3218; H04L 9/3265
See application file for complete search history.

(56) References Cited

U.S. PATENT DOCUMENTS 4,991,210 A * 2/1991 Chaum ................. G07F 7/1016
713/180
10,425,401 B1 * 9/2019 Pecen ................ H04L 63/0815
(Continued)

*Primary Examiner* — Darren B Schwartz
(74) *Attorney, Agent, or Firm* — CALDWELL INTELLECTUAL PROPERTY LAW

(57) ABSTRACT

A system for implementing mixed protocol certificates, the system includes a subject device designed and configured to receive, from an issuing device, a first digital certificate, wherein the first digital certificate further comprises a first digital signature public and private key pair according to a first digital signature protocol and a second digital signature public key according to a second digital signature protocol, wherein the second digital signature protocol is distinct from the first digital signature protocol, to generate a second digital certificate, wherein generating the second digital certificate comprises generating a subject digital signature signing the certificate, the subject digital signature generated as a function of the second digital signature protocol and to provide the first digital certificate and the second digital certificate to a verifying device.

18 Claims, 4 Drawing Sheets

Related U.S. Application Data continuation-in-part of application No. 16/682,809, filed on Nov. 13, 2019, now Pat. No. 10,735,205.

(60) Provisional application No. 62/815,493, filed on Mar. 8, 2019.

(56) References Cited

U.S. PATENT DOCUMENTS

| | | | |
|---|---|---|---|
| 2003/0190046 A1* | 10/2003 | Kamerman | H04L 9/3265 713/176 |
| 2007/0011453 A1* | 1/2007 | Tarkkala | H04L 9/3247 713/168 |
| 2009/0210705 A1* | 8/2009 | Chen | H04L 9/3247 713/158 |
| 2010/0174911 A1* | 7/2010 | Isshiki | H04L 9/3257 713/182 |
| 2012/0173877 A1* | 7/2012 | Pendakur | H04N 21/4367 713/169 |
| 2018/0359097 A1* | 12/2018 | Lindell | H04L 9/3247 |
| 2018/0367305 A1* | 12/2018 | Gouget | G07C 13/00 |

* cited by examiner

METHODS AND SYSTEMS FOR IMPLEMENTING MIXED PROTOCOL CERTIFICATES

CROSS-REFERENCE TO RELATED APPLICATIONS

This application is a continuation of Non-provisional application Ser. No. 16/828,358 filed on Mar. 24, 2020 and entitled "METHODS AND SYSTEMS FOR IMPLEMENTING MIXED PROTOCOL CERTIFICATES," which is a continuation-in-part of Non-provisional application Ser. No. 16/682,809 filed on Nov. 13, 2019 and entitled "METHODS AND SYSTEMS FOR IMPLEMENTING AN ANONYMIZED ATTESTATION CHAIN," which claims the benefit of priority of U.S. Provisional Patent Application Ser. No. 62/815,493, filed on Mar. 8, 2019, and titled "METHODS AND SYSTEMS FOR IMPLEMENTING AN ANONYMIZED ATTESTATION CHAIN." Each of Non-provisional application Ser. No. 16/828,358 and Non-provisional application Ser. No. 16/682,809 and U.S. Provisional Patent Application Ser. No. 62/815,493 is incorporated by reference herein in its entirety.

FIELD OF THE INVENTION

The present invention generally relates to the field of cryptography. In particular, the present invention is directed to systems and methods for implementing mixed protocol certificates.

BACKGROUND

Digital certificates are the backbone of secure communication and commerce, and in turn are supported on the backs of digital signature protocols. However, the very ubiquity of such technology militates against adoption of new variations, as any significantly altered protocol must be near universally adopted to be useful. Thus, various possible improvements to digital certificates and the processes that require them are delayed, and the technology stagnates.

SUMMARY OF THE DISCLOSURE

In an aspect, a system for implementing mixed protocol certificates includes a subject device designed and configured to receive, from an issuing device, a first digital certificate, wherein the first digital certificate including a first digital signature public and private key pair according to a first digital signature protocol and a second digital signature public key according to a second digital signature protocol, wherein the second digital signature protocol is distinct from the first digital signature protocol, to generate a second digital certificate, wherein generating the second digital certificate comprises generating a subject digital signature signing the certificate, the subject digital signature generated as a function of the second digital signature protocol and to provide the first digital certificate and the second digital certificate to a verifying device.

In another aspect a method of implementing mixed protocol certificates includes receiving, by a subject device and from an issuing device, a first digital certificate, wherein the first digital certificate further comprises a first digital signature public and private key pair according to a first digital signature protocol and a second digital signature public key according to a second digital signature protocol, wherein the second digital signature protocol is distinct from the first digital signature protocol. The method includes generating, by the subject device, a second digital certificate, wherein generating the second digital certificate comprises generating a subject digital signature signing the certificate, the subject digital signature generated as a function of the second digital signature protocol. The method includes providing, by the subject device, the first digital certificate and the second digital certificate to a verifying device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
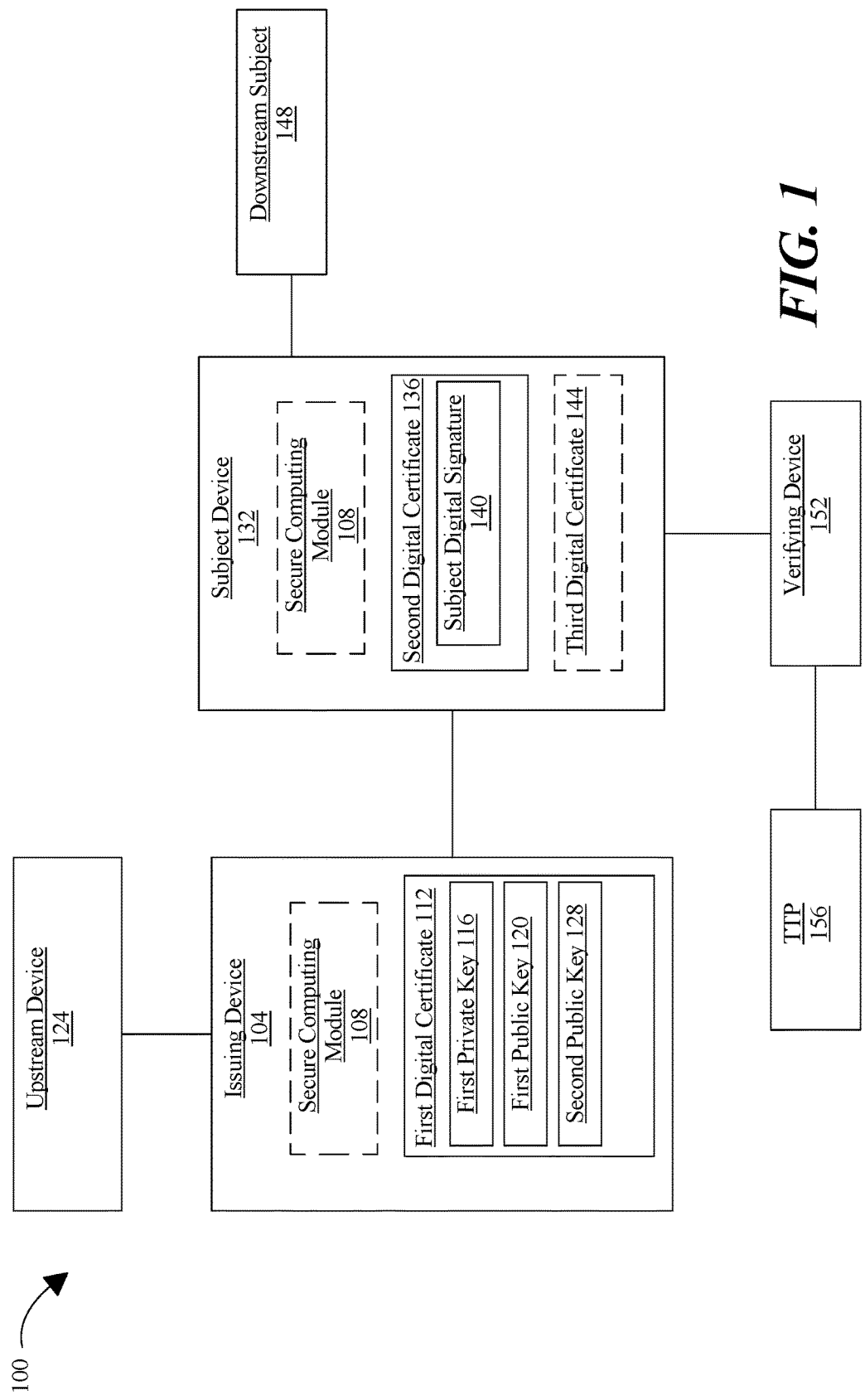
FIG. 1 is a block diagram of a system for implementing mixed protocol certificates.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Embodiments presented herein provide a framework that allows new digital signature technology to be introduced into existing digital certificate protocols, permitting innovations to disseminate without disrupting legacy systems. This is accomplished by generation, chaining, presentation, and/or verification of mixed protocol certificates, which include digital signatures produced using two or more distinct protocols, of which one may be a conventional digital signature protocol and another may be an novel digital signature protocol having additional capabilities and/or attributes; such additional capabilities and/or attributes may act to enhance security, privacy, flexibility, or other goals where utilized, while the inclusion of conventional digital signatures may provide legacy systems with the ability to rely on standard certificate protocols until update or replaced. Inclusion of heterogenous signature protocols may also introduce additional robustness to attack through redundancy.

In today's certificate infrastructure, an issuer issues certificates to a subject's public key without the subject proving it owns the secret key associated with the subject public key. The certificate issuer must assume that the certificate recipient is the correct party, without authentication or with authentication established out-of-band. This is a tremendous assumption. In a typical setting, a recipient may present some out-of-band datum to the issuer that validates the legitimate recipient, though this is largely unchecked. Thus, a recipient of a certificate may be any party with sufficient heuristic to convince an authority. In addition, existing certificates tend to expose the identity of the recipient as an element of maintaining the integrity of the system. Moreover, today subject authentication is solved by having people actively take part in administering certificates. This makes it a slow and expensive process. Certificates are rarely updated and have to be given a long effective lifetimes. A compromised certificate has a correspondingly long lifetime in which to be exploited.

Use of anonymous credential protocols may help to solve above-described problems with certificates. However, anonymous credentials are not incorporated into any commonly used protocols. This poses major challenges to deploying anonymous credentials into existing infrastructure. For instance, a problem presented may include an incompatible Issuer Signature: a subject may present a certificate signed by the issuer. Firewalls, web hosts, service provider hosts (e.g. AWS) verify certificates used to establish connections; such participant components may be required to recognize a format of the issuer public key (i.e. secret key description) and a format of an issuer signature on a certificate. These gatekeepers may not permit a connection even if the application layer does implement a custom anonymous authentication protocol. Incompatible Subject Secret Key Description may also pose a problem: secure communication libraries (e.g. TLS) use the subject secret key description (e.g. RSA public key) to execute a standard handshake and establish a shared secret. Anonymous authentication schemes use non-standard secret key descriptions.

Embodiments disclosed herein create anonymous and authenticated secure communication sessions using commonly deployed protocols (e.g. TLS). A participant may present a chain of certificates, such as without limitation X.509 certificates. A root certificate of such a chain may be a certificate self-signed by a well-known Certificate Authority. A leaf certificate may have a subject public key that will be used for a TLS handshake. However, a verifying party cannot learn any information about a participant proffering such a certificate. In addition, each time a participant enters a TLS session using his original credentials, such a session may be unlinkable to prior sessions; the participant may be able to enter in these anonymous TLS sessions without acquiring more credentials and can even communicate anonymously with an original certificate issuer.

Embodiments may further increase security of a connection by (1) requiring a participant to prove to a certificate issuer that the participant actually owns the secret key being signed and (2) making it possible for a counterparty to a resulting secure connection to verify a party on the other end owns the secret key. Embodiments may make no modifications to the secure communication client libraries (e.g. TLS clients) or to standard certificate formats (e.g. X.509), and may also ensure that gatekeepers such as firewalls, TLS proxies, and web hosts can recognize and validate certificates with no modification. This may be achieved with a solution consisting of three portions: (1) An interactive certificate issuance protocol during which an issuer can verify that a receiver knows a secret key associated with a subject of the certificate, (2) A non-interactive show protocol that the participant uses to generate a chain of certificate(s) that can be processed by standard secure communication libraries (e.g. unmodified TLS client) to establish a connection, and (3) a verification protocol that checks the additional security claims in the certificates. A leaf certificate may look like a standard certificate. If a participant does not have a Policy that understands custom attributes inside certificate, the participant may treat it as a certificate signed by an unknown issuer. Two parties may still be able to establish a mutually authenticated secure communication session.

In an embodiment, methods and systems described herein may perform implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Referring now to FIG. 1, an exemplary embodiment of a system 100 for mixed protocol certificates is illustrated. System may include an issuing device 104. Issuing device 104 may include any computing device as described in this disclosure, including without limitation a microcontroller, microprocessor, digital signal processor (DSP) and/or system on a chip (SoC) as described in this disclosure. Issuing device 104 may include, be included in, and/or communicate with a mobile device such as a mobile telephone or smartphone. Issuing device 104 may include a single computing device operating independently, or may include two or more computing device operating in concert, in parallel, sequentially or the like; two or more computing devices may be included together in a single computing device or in two or more computing devices. Issuing device 104 may interface or communicate with one or more additional devices as described below in further detail via a network interface device. Network interface device may be utilized for connecting issuing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Issuing device 104 may include but is not limited to, for example, a computing device or cluster of computing devices in a first location and a second computing device or cluster of computing devices in a second location. Issuing device 104 may include one or more computing devices dedicated to data storage, security, distribution of traffic for load balancing, and the like. Issuing device 104 may distribute one or more computing tasks as described below across a plurality of computing devices of computing device, which may operate in parallel, in series, redundantly, or in any other manner used for distribution of tasks or memory between computing devices. Issuing device 104 may be implemented using a "shared nothing" architecture in which data is cached at the worker, in an embodiment, this may enable scalability of system 100 and/or computing device.

Issuing device 104 may be designed and/or configured to perform any method, method step, or sequence of method steps in any embodiment described in this disclosure, in any order and with any degree of repetition. For instance, issuing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Issuing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, issuing device 104 may include a secure computing module 108. As used herein, a secure computing module 108 is a hardware or software element configured to perform one or more secured operations beyond the control of other circuit elements or software, whether incorporated with the secure computing module 108 in a circuit or computing device, or a part of an extrinsic computing device. As a result, at least one secured operation performed by secure computing module 108 may be intrinsically reliable; that is, the at least one secured operation may be relied upon by any other module or user to produce an expected result regardless of behavior by neutral or adversarial parties, as long as some basic set of assumptions hold true. Other parties may be able to assign a confidence level in secure computing module 108 and/or a system or computing device incorporating secure computing module 108 based on the above-described set of assumptions. As a non-limiting, example, a secure computing module 108 designed to produce an expected result despite all software-only attacks may give rise to a first confidence level, whereas another secure computing module 108 designed to produce its expected result in the face of all software or hardware attacks may give rise to a second confidence level; the second confidence level may be higher, owing to the reduced probability that the second secure computing module 108 would be compromised.

Still viewing FIG. 1, secure computing module 108 may include a trusted platform module (TPM). In an embodiment, a TPM may include a hardware module, which may be an integrated circuit, an optoelectronic circuit, a section of an integrated circuit on the same die as a processor, an integrated circuit packaged with other die in a multi-chip module or other multi-die integration method, or printed circuit board product; TPM may have any suitable elements of digital or analog circuitry usable to perform one or more processes as described herein, including without limitation processes used to determine confidence levels and/or authenticate digitally signed assertions as described below. TPM may have memory and/or other logic and/or a processor in its own right which may be in a non-limiting example a crypto processor. TPM may have a hard-coded process, e.g. via protected ROM or secure flash, for signing a digital signature, which may be performed using any digital signature and/or digital signature protocol described in this disclosure, including without limitation using a private key, which may be associated with a public key, and/or a class of public keys, and/or may be a private key of a symmetric cryptographic system. TPM may be configured to incorporate a secure enclave and/or protocols for performing attestation on behalf of an untrusted or less trusted hardware or software element, e.g. TPM may be configured to have attestation requests from such a less trusted element relayed to it for secure signing, and may include packaging of signed data for use in an attestation protocol, representative embodiments of which are included in this disclosure. For instance, and without limitation, TPM may sign enclave attestations; as a non-limiting example, an enclave such as an SGX enclave or the like may be attested to using long-lived security of device keys inside the TPM. This private key and/or signing process may be performed using any digital signature and/or digital signing protocol described in this disclosure. For instance, and without limitation, a private key, signature, and/or signing process may be produced using a genuinely random process during manufacturing and/or at a later stage, and/or unique object (UNO) fingerprint, and/or a physically unclonable function (PUF), or any other disorder-based security primitive, defined as a function that creates challenge responses from a physical circuit that depend on unique features of that circuit, including without limitation microstructure features or elements that depend on random physical factors occurring or conferred during manufacture. Private key may be determined and/or extracted using PUF processes, for instance and without limitation using a fuzzy extractor, key extractor physically unclonable function, and/or other software techniques. Private key extraction may utilize additional corrective measures, including as a nonlimiting example machine learning, neural networks, convolutional neural networks and the like, or other approaches to provide error correction over the operating temperature range of the device. Private key generation may additionally incorporate true random number generator(s) (TRNGs), pseudorandom number generators (PRNGs) and related devices.

With continued reference to FIG. 1, secure computing module 108 may include at least PUF. PUF may be implemented by various means. In an embodiment, PUF includes one or more non-intrinsic PUFs. Non-intrinsic PUFs may include without limitation optics based PUFs. Optics-based PUFs may include, as a nonlimiting example, optical PUFs. An optical PUF may be implemented by combining a light source such as lasers with a material that causes unpredictable scattering from the light source; one or more light sensors or light sensor arrays may be used to detect scattered light and output an electrical signal, for instance by generating, at a given light sensor unit, a logic 1 signal for detected light above a given threshold intensity or energy content, and a logic 0 signal for detected light below such threshold. Each light sensor may include any suitable device for converting light to an electrical signal; such devices include, without limitation, avalanche photodiodes (APDs), single photon avalanche diodes (SPADs), silicon photomultipliers (SiPMs), photo-multiplier tubes (PMTs), micro-channel plates (MCPs), micro-channel plate photomultiplier tubes (MCP-PMTs), photodiodes, and/or photosensitive or photon-detecting circuit elements and/or transducers. Avalanche photo diodes (APDs), as used herein, may include diodes (e.g. without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. When the reverse bias is less than the breakdown voltage, the gain of the APD is approximately linear. For silicon APDs this gain is on the order of 10-100. An APD reverse biased significantly above the breakdown voltage is referred to as a Single Photon Avalanche Diode, or SPAD. In this case the n-p electric field is sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode. Persons skilled in the art, upon reviewing the entirety of this disclosure, will be aware of various alternative or additional light detection devices that may be used to detect light scattered by scattering medium.

Still referring to FIG. 1 non-intrinsic PUF may include without limitation a radio frequency (RF)-based PUF. A radio-frequency PUF may be constructed by embedding thin, randomly arranged copper wires in flexible silicone sealant or other RF permissive medium to be exposed to a source of electromagnetic waves, which may, in a non-limiting example, emit in the 5-6 GHz band; near-field scattering of such waves may be detected, for instance, using a matrix of antennas to produce an "RF-DNA PUF" secret. near-field scattering of EM waves by the copper wires may be measured, for instance in a 5-6 GHz band; RF-DNA PUFs. Alternatively, an RF-based PUF may be fabricated as an inductor-capacitor (LC) PUF by for instance by incorporating a capacitor, such as a glass plate with metal plates on both sides, serially chained with a passive inductor such as a metal coil on the glass plate; this may form a passive LC resonator circuit which may absorb some amount of power when placed in an external RF field, using for instance an RF emitter as described above. A frequency sweep may indicate the circuit resonant frequencies, which depend on the capacitive and inductive components. Manufacturing variations in the construction may lead to resonant peak variations, the detection of which may generate secret. Persons skilled in the art, upon reviewing the entirety of this disclosure, will be aware of various alternative, additional, or modified methods, means, and/or procedures suitable for use in fabrication of the above described PUFs, or of modification of methods for construction of RF PUFs to be compatible with fabrication of other elements, or with methods of fabrication thereof, as disclosed herein, including without limitation CMOS fabrication.

With continued reference to FIG. 1, non-intrinsic PUF may include one or more electronics based PUFs. Electronics-based PUFs may include, as a nonlimiting example, coating PUFs. In a non-limiting example of a coating PUF, a comb-shaped sensor may be fabricated on the surface of an integrated circuit. A passive dielectric coating may be sprayed directly on the surface, where the dielectric particles are dispersed randomly. Capacitance measurements between sensors may be used as identifiers. Opaque and chemically inert coating may offer further protection. Non-intrinsic PUFs may include power distribution network PUFs. Power distribution network PUFs may be based on resistance variations in a power grid of a silicon chip. Voltage drops and equivalent resistances in power distribution system may be measured and subject to random manufacturing variability. Additional non-intrinsic PUFs may include, without limitation, compact disc (CD)-based PUFs. For instance, measured lengths of lands and pits on a CD may exhibit a random deviation from their intended lengths due to fabrication process variations. This variation may be large enough to be observed by monitoring the electrical signal of the photodetector in a CD player. Non-intrinsic PUFs may include acoustical PUFs, which may be constructed by observing the characteristic frequency spectrum of an acoustical delay line, where a bit string is extracted by performing principal component analysis. Non-intrinsic PUFS may include magstripe-based PUFs, which may leverage randomness of particle patterns in magnetic media (for instance in magnetic swipe cards). These types of PUFs may be used commercially to prevent credit card fraud. In all examples, the bit string may be obtained by a number of mathematical processes, for example independent component analysis (ICA), principal component analysis (PCA), signal power spectral density (PSD) etc.

In an embodiment, and still referring to FIG. 1, PUF may include an "intrinsic PUF" produced via semiconductor construction, including without limitation the fabrication of semiconductor circuit elements based on silicon. As a non-limiting example, a pair of paths may be simulated with identical properties in a design of an integrated circuit; upon fabrication based on simulation, signals may propagate around each path of the pair of paths at a slightly different rate than the other path of the pair of paths. Fabrication may further include fabrication of an "arbiter" component connected to the two paths, the arbiter component configured to generate a first output if a signal arrives first from a first path of the two paths and a second output if a signal arrives first from a second path of the two paths; first output and second output may correspond, as a non-limiting example, to digital values such as logic 1 and logic 0. A plurality of such constructions may be combined to produce a plurality of randomly generated output bits. Other such race-condition PUFs may be similarly constructed. In an embodiment, an intrinsic PUF circuit may be manufactured by fabricating a circuit including two multiplexors, two counters, one comparator, and a plurality of ring oscillators; each oscillator may connect to an input of the two multiplexors, which may be configured to select two ring oscillators to compare, while the counters count the number of oscillations per a time period, and the output is set to 0 if one counter has a higher value and 1 if another counter has a higher value. Multiple such combinations may be used to generate a plurality of bits.

With continued reference to FIG. 1, intrinsic PUFs may include asynchronous PUFs, which may be synonymous with Self-Timed Ring PUFs. These may possess the same structure as the generic ring oscillator, however such PUFs may use self-timed rings instead of the inverter chains. The design may be based on the use of the Muller's C-element, a fundamental building block of asynchronous circuits. A significant benefit of self-timed rings may be that they make resulting PUF more immune to environmental variations. However, there may be an increase in the used silicon surface area. Furthermore, these self-timed structures may be prone to entering deadlock states. Intrinsic PUFS may include glitch PUFS; this may also involve a delay based PUF construction which may be based on glitch behavior of combinatorial logic circuits. Occurrence of glitches may be determined by the difference in delay of the different logical paths from the input to output. As with other delay-based methods, the exact circuit delays may be subject to silicon manufacturing variations, and the number and shape of resulting glitches on output signals may be unique and be used as a PUF response.

Continuing to refer to FIG. 1, PUF may include a circuit producing a PUF via cross-coupled logical or analog circuit elements. As a non-limiting example, static random-access memory 256 (SRAM) PUFs may be produced by cross-coupling two inverters and two access transistors. When the cell is powered up, the two cross-coupled inverters may enter a "power-struggle," where the winner is decided by the difference in the driving strength of the MOSFETs in the cross coupled inverters. Theoretically, there may be three possible states, where two are stable and one is metastable. If the transistors in the inverter circuits are perfectly matched, then the SRAM may remain metastable forever. Practically speaking, even though the transistors are designed to be identical, random variations in fabrication may ensure one has a stronger driving current, and this defines the initial start-up value for the cell. The majority of cells have an initial state that consistently may be returned to when powered up, and this is an important characteristic that allows them to be used for PUFs; a plurality of such cells may be used to generate a plurality of bits. Cross-coupling may be performed between other elements, such as without limitation a cell made up of two cross-coupled NOR gates (otherwise known as a latch); in operation, latch may be forced into an unstable state the resolution of which to either logic 1 or logic 0 may depend on slight mismatches between NOR gates. Similarly, a D flip-flop may be incorporated in a circuit that detects its power-up behavior. Alternatively or additionally, a PUF circuit may be fabricated by cross-coupling two transparent data latches, forming a bistable circuit. By leveraging the clear functionality of the latches, the circuit may be forced into an unstable state and converge when released to an output determined by slight manufacturing variations. Other examples of PUF in an embodiment include without limitation buskeeper PUFs, which may be similar to other PUFs based on bistable memory elements but leveraging buskeeper cells. PUF may also combine two or more PUF designs, for instance a bistable ring PUF, which may be a hybrid of a ring oscillator PUF and a SRAM PUF, wherein the structure is similar to the ring oscillator PUF, but the number of inverting elements is even. This may mean that the loop does not oscillate but is bistable (like the SRAM PUF). Using reset logic, the bistable ring may destabilize and subsequently stabilize into a state that is set by the random silicon manufacturing variations.

In an embodiment, and still viewing FIG. 1, PUF may include a circuit implementing a quantum PUF. A quantum PUF, as used herein, is a PUF that generates secrets, such as random numbers, that are unique to the PUF owing to the nanostructure of atomic layers in an electronic or other component, so that the variations are governed by quantum physics, and harder to predict. Quantum PUF may include a quantum confinement PUF, which may operate by varying its output according to variations in behavior due to quantum confinement as determined by nanostructure of atomic layers of one or more components. In an embodiment, uniqueness of a quantum PUF or quantum confinement PUF may be made highly probable by the inherently random nature of atomic positions and imperfections in a quantum well. Simulating structures on such a scale may require computationally infeasible amounts of computing power, even for some quantum computers, particularly where multiple quantum PUF elements are used together; infeasibility may be enhanced by the unknown nature of the nanostructures, which may be impossible to determine without atom-by-atom dismantling.

Still referring to FIG. 1, implementation of quantum confinement PUFs may be achieved using any device that can measure phenomenological properties arising from behavior governed by quantum mechanics, such as without limitation properties governed by quantum confinement. Implementation may, as a non-limiting example for illustrative purposes, involve characterizing fluctuations in tunneling through quantum wells in resonant tunneling diodes (RTDs); an RTD may permit electrons to tunnel through it directly where voltage across the RTD places an energy level at a conduction band minimum. As confined energy level may be exponentially sensitive to width and height of a quantum well determined by atomic-level variations, such as variations atomic uniformity at interfaces between layers in RTD, this may cause the required voltage for tunneling to vary according to such variations in RTD, causing RTD behavior to be dictated by such variations. Such diodes may, in a non-limiting example, be constructed by fabricating from an InGaAs/AIAs double-barrier structure, formation of top and bottom ohmic contacts, and etching, which may be wet-etching, to isolate the resulting component from other structures on the die. Quantum confinement PUF may function, as a non-limiting example, through measuring electronic properties, for instance by determining current/voltage response of one or more RTDs, other types of diodes and/or combinations of various types of diodes (in any parallel or series arrangement) and analyzing the resultant curves for peak values, slopes, gradients, valleys, full-width-half-max, number of peaks, or other component identified by the current-voltage response that would serve as a uniquely identifying characteristic. Confined energy levels may be highly sensitive to the specific nanostructure within each RTD, leading to a distinct tunneling spectrum for every device. As a non-limiting example, measurement may be performed by finding currents corresponding to energy levels by sweeping voltage across each RTD through a range and recording the resulting currents. Multiple RTDs may be combined to increase output complexity, for instance by coupling together in series or by using a crossbar structure as for other diode based PUFs.

Continuing to refer to FIG. 1, as persons skilled in the art will be aware upon reviewing the entirety of this disclosure, variations may be applied to RTDs and/or manufacture of RTDs to increase a degree of variation in response from one RTD to another. For instance, RTDs may be selected and/or manufactured to have a double barrier rather than a single barrier, causing behavior to depend on four barrier interfaces rather than two barrier interfaces. Variations may include incorporation of a ternary material into quantum well. Variations may include manipulations of manufacturing steps to create uniqueness, such as without limitation inducing variations in molecular bean epitaxy growth, for instance by not rotating a sample stage during a particular step; this may introduce 1-monolayer variations at barriers, which may induce additional I-V characteristic variations. In an embodiment, such variations may also render the RTD-based PUF more tamper-resistant, as invasive probing of device would distort nanostructure and change the outputs; alternatively or additionally, a PUF manufactured in this way may be reconfigurable by, for instance, a controlled application of heat causing modifications to the nanostructure. Implementation variations may further include exploitation of changes in PUF response due to local variations in temperature and magnetic field; such changes would be unknown to an attacker and may enable the production of multiple unique IDs based on such fluctuations, in a manner unpredictable even to the manufacturer.

With continued reference to FIG. 1, other elements or components may be used instead of or additionally to RTDs to exploit variations in quantum-physical behavior based on nanoscale variations. Such elements or components may include, without limitation, three-dimensional nanostructures, such as quantum dots, which typically have many electron and hole confinement levels. RTDs or similar elements may be modified to contain single, or a few, dots, converting this increase in the number of confined states to an increased number of peaks in their dI/dV curves; each peak, when fitted individually and combined, could form part of a unique key for at least a secret generator 204*a-b*. A number of dots in a device such as an RTD does may not be reproducible or may be allowed to vary. There may be many constructions of quantum PUFs and/or quantum-confinement PUFs based on these principles as will be evident to those skilled in the art, upon reviewing the entirety of this disclosure, including without limitation use of alternative or additional structures or components incorporating two or three-dimensional features evincing electrical behavior that varies based on quantum-physical properties affected by nanoscale manufacturing variations.

Continuing to view FIG. 1, other applications of other types of PUFs, such as uniquely identifying a particular material good based on, for example, a unique pattern developed due to the details of how the part was manufactured, extruded, finish coating was sprayed, etc., either across the part or at one or more points on the part, may also be implemented or exploited. These details may include optical reflection/scattering at one or more of the material interfaces, the measurement of this optical response, and optionally the computation of a digital bit string uniquely identifying or representing the optical response.

With continued reference to FIG. 1, PUF may include, without limitation, PUFs implemented using design of vertical interconnect accesses (VIAs) in multi-layered chips or integrated circuits. A "VIA-PUF" may be created by, without limitation, designing VIAs with a small enough size that there is a roughly equal chance that they will or will not be created; this may cause the VIAs that function in the completed circuit to be randomly placed, leading to circuit behavior that is not predictable ahead of time. The above-mentioned randomness generated by random VIA creation may cause the resulting circuit to behave as a PUF. Such a VIA-PUF may be extremely robust over time and across environmental conditions.

Continuing to refer to FIG. 1, PUF may include one or more photonic PUFs. In an embodiment, a photonic PUF may take advantage of the fact that some photonic devices can operate in a non-linear and/or chaotic manner. In a non-limiting example, a photonic PUF is manufactured by creating a microcavity in a material, such as silicon; microcavity may be formed with a chamfer. Microcavity may be formed, as a non-limiting example with a diameter on the order of tens of micrometers; for instance, microcavity may have a 30-micrometer diameter in an exemplary embodiment. Chamfer size and position may be varied between microcavities; arbitrarily positioned holes may be formed in an interior surface of one or more microcavities to induce irregularities; further irregularities may be introduced as an inevitable result of limits on manufacturing consistency. Irregularities may create variable reflective and/or refractive responses to a pulse of light, which may include, as a non-limiting example, a pulse in the femtosecond to attosecond range, such as, for illustrative purposes only, a 175-femtosecond pulse from a model-locked laser having a 90-MHz repetition rate. Fabrication may include incorporation of the light source. In operation, Optical output waveforms may also be complex and highly sensitive to precise physical cavity structure; at the same time responses may remain highly repeatable. Continuing the example, ultra-short optical pulses (e.g. in the femtosecond to attosecond region) may be used to probe micro-cavities; the pulses may excite a unique combination of spatial optical modes that may interact with fine-scale structure of cavity interiors and with one another through optical nonlinearity of silicon. Each sequence of optical responses may contain spatiotemporal features that are extremely sensitive to cavity structures. It may be possible to extract long binary keys, including keys on the order of gigabytes, from a single micro-cavity PUF. Alternative or additional non-linear photonic devices may be used to implement a photonic PUF.

Further viewing FIG. 1, other examples of PUF that may be used may include, without limitation, nano electromechanical (NEM) PUFs. NEM PUFs may include PUFs that leverage stiction of a silicon nanowire to a binary gate structure. NEM PUFs may include those based on interfacial magnetic anisotropy energy, such as use of the random distribution of magnetization orientation originating from the sub-nanometer variation of oxide layer produced by the thinning process. In an embodiment, an NEM PUF system may be highly robust; as a non-limiting example, NEM PUF may work effectively across a wide range of environmental conditions, including without limitation thermal variation, exposure to microwave radiation, and exposure to high dose radiation at various frequencies. Additional methods for PUF implementation may include, without limitation Kirchoff-law-Johnson-noise (KLJN) PUFs, which may use KLJN key exchange to generate, between two hardware components, a new and manufacturer-unknown secret key which may be stored locally in, for instance, secure hash memory.

Still referring to FIG. 1, in an embodiment, one or more bits may be output directly from the PUF and/or TPM; such outputs may be used to generate symmetric or asymmetric keys, private keys, zero-knowledge proofs, or other proofs of authenticity, as described in further detail below.

Continuing to refer to FIG. 1, secure computing module 108 may implement one or more secure memory storage protocols. One or more secure memory storage protocols may be protocols designed to prevent unauthorized access to memory and/or to protect secure computing module 108 from attacks compromising memory; secure memory storage protocols may prevent, as a non-limiting example, compromise of memory used for computation. In an embodiment, one or more memory elements may be located within a trusted computing boundary (TCB); TCB may be a boundary within which it is physically, information-theoretically, or computationally infeasible for exterior computing elements to probe, manipulate, access, or otherwise interact with elements under control of or incorporated in secure computing module 108. For instance, and without limitation, it may be infeasible to physically probe the memory or access the memory from other software elements. In some embodiments, one or more memory elements may be located outside of trusted computing boundary. In some embodiments, a memory interface uses algorithmic techniques to randomize memory access patterns, for instance using obfuscated access, oblivious RAM, or ORAM. Such algorithmic techniques may implement one or more randomization techniques. In an embodiment, when crossing a trusted computing boundary, a memory interface data bus may be encrypted; that is data passed to the memory interface data bus may be encrypted using any hardware or software-based encryption techniques discussed in this disclosure. In an embodiment, secure computing module 108 may incorporate a memory controller located within the trusted computing boundary to encrypt and authenticate by a secret key memory element such as without limitation memory page tables and/or memory pages accessible by other software elements, such as an operating system. Various techniques, processes, means or elements may be used to implement the above-described secure memory protocols. For instance, secure computing module 108 may use hardware-enabled access control to protect memory access; hardware access control may, as a non-limiting example, be performed by tagging each memory entry with a "container identifier" corresponding to a page, file, or other grouping of memory, enabling secure computing module 108 to determine whether tampering has occurred.

Still referring to FIG. 1, secure computing module 108 may perform one or more safe-sharing protocols for hardware shared with other resources; for instance, where an exception, termination of a programmed process, or other condition causes a secured process to exit, shared registers may be reset to eliminate protected data prior to access by other processes. Secure computing module 108 may operate using one or more dedicated memory objects, registers, or storage elements; as a non-limiting example, secure computing module 108 may operate with dedicated cache lines not available to other processes or circuits, preventing, e.g., stack or buffer overrun attacks to corrupt or steal data. Dedicated memory elements may be wired only to secure computing module 108; access to dedicated memory elements may be rendered impossible except by way of secure computing module 108. Secure computing module 108 may use one or more order-preserving memory storage protocols to detect "reset attacks" or fraudulent data entries presented out of order; such order preserving memory storage protocols may include, without limitation, Merkle trees or other hash trees in which each new entry contains a hash of a recently stored data entry and a hash of earlier Merkle tree and/or hash tree entries, rendering false or out-of-order entries computationally infeasible, or any temporally sequential listing as described below, including without limitation blockchains and the like. Secure computing module 108 may utilize oblivious random-access memory (RAM) wherein memory access patterns are obfuscated to prevent detection of memory access patterns by outside observers attempting to deduce execution details regarding processes performed using secure computing module 108. Secure computing module 108 and/or device incorporating secure computing module 108 may incorporate a trusted non-volatile storage device that provides some means of verification of secure storage capability and other properties. Memory protocols as described above may be used to implement methods of attested storage and the chain of trust beginning at PUF level up through processor, memory and code. Such mechanisms may be used to secure long-term storage (e.g. SSDs, spinning disks, tape, other), RAM, or other memory storage facilities. Persons skilled in the art, upon reviewing the entirety of this disclosure, will be aware of various ways in which memory storage, securing, encryption, measuring, and attesting techniques as disclosed herein may be implemented and/or utilized by or with secure computing module 108.

Still referring to FIG. 1, secure computing module 108 may include a secure processor. Secure processor may be a processor as described in this disclosure. Secure processor may operate autonomously from other processors and/or an operating system operating on at least a cryptographic evaluator; for instance, secure processor may store entries in temporary or long-term memory in encrypted form, where decryption is impossible without private keys not available to devices, circuits or software besides secure processor. Encryption may likewise be impossible without private keys available only to secure processor. Secure processor may also digitally sign memory entries using, for instance, a private key available only to secure processor; digitally signing may be performed using any form of digital signature described in this disclosure. Keys available only to secure processor may include keys directly encoded in hardware of the secure processor; i.e., a process to digitally sign and/or encrypt using keys may be coded using logic circuits, field-programmable arrays, read-only memory, burning into memory using one-time programmable polysilicon fuses, or the like, and thus be immutable absent physical changes to secure processor. Secure processor may be constructed, similarly to TPM, to frustrate alteration and/or probing to discover and/or alter private keys. Private keys may be demonstrable as uniquely associated with secure processor by use of PUF as described above; secure processor may include, for instance, a TPM as described above. Alternatively or additionally, a certificate authority as described below, which may be a manufacturer of secure processor, may verify that one or more public keys are associated uniquely with secure processor according to any protocol suitable for digital certificates.

Still referring to FIG. 1, examples of a secure computing module 108 may include, without limitation, TPM as described above. The secure computing module 108 may include TPM combined with a boot-measuring protocol using hash trees, Merkle trees, or the like to measure boot entries to create an "attested boot," additionally or separately from the attested computation description described above. A secure computing module 108 may include a trusted execution technology (TXT) module combining a TPM with establishment of a secure container at run-time; secure container may be isolated from a software stack and OS of at issuing device 104 and/or use TPM to measure and attest to secure container prior to launch. Secure computing module 108 may implement a trusted enclave, also known as a trusted execution environment (TEE) or secure enclave. In an embodiment, a trusted enclave may be a portion of a computing device that is isolated from the main processor of the computing device. Isolation may be achieved using elements of secure computing module 108 as described above, including isolation of memory. Isolation of memory may be achieved through any process or architecture as described above for secure memory, including encryption using a cryptographic system a decryption and/or encryption key to which a secure processor or TPM has access, but to which a CPU or other main processor, as well as input/output devices or connections, does not and/or use of dedicated cache lines or the like to physically separate memory accessible to secure computing module 108 from CPU and/or input/output devices or connections. Inputs and outputs to and from trusted enclave may be restricted and controlled tightly by a secure processor and/or TPM as described above, including software security monitors. Trusted enclaves may be considered protected memory primitives in which the program stack and stack pointer are reset prior to loading of code into the enclave and flushed prior to exiting trusted enclave operation. In general trusted enclaves may be defined as hardware or software primitives that prohibit unauthorized access to memory segments during execution of sensitive code, including via access to processor caches. Trusted enclave may perform trusted and/or attested computing protocols as described above, including without limitation attested boot protocols. Examples of trusted enclaves include without limitation those enabled by SOFTWARE GUARD EXTENSIONS (SGX) systems as promulgated by Intel Corporation of Santa Clara, Calif. The Sanctum architecture and Ascend secure infrastructure from MIT, Ghostrider secure infrastructure, ARM TrustZone, Trusted Little Kernel (TLK) as promulgated by Nvidia Corporation of Santa Clara, Calif., and Secure Encrypted Virtualization (SEV) as promulgated by Advanced Micro Devices, Inc. of Santa Clara, Calif., RISC-V physical memory protection (PMP) based isolated software modules, and/or any other suitable architecture. Persons skilled in the art, upon reviewing the entirety of this disclosure, will be aware of various additional or alternative trusted computing processes that may be used to implement secure computing module 108, TEE, or trusted enclaves as disclosed herein. System 100 may incorporate or communicate with a certificate authority, public key infrastructure (PKI), distributed CA or distributed PKI.

With continued reference to FIG. 1, issuing device 104 may be configured to generate a first digital certificate 112. A "digital certificate," as used herein is a message that is given from an issuer such as issuing device 104 to a subject, such as subject device 132, and conferring a credential such as an endorsement of an identity, confidence level and/or degree of trustworthiness, access right, link to a root of trust or signature chain therefrom as described in further detail below, and/or an assurance that signatures generated from the certificate may be relied upon for communication protocols as descried in further detail below. A subject of a digital certificate may provide the certificate to a verifier, as described in further detail below to establish communication with the verifier, for instance as part of a handshake protocol to establish a transport security layer (TLS), secure sockets layer (SSL), secure shell (SSH), secure hypertext transfer protocol (HTTP 156S), or other secure communication session. There also may be standard authentication and authorization protocols such as OAuth or OpenID Connect that determine whether to establish a connection. In mutual authentication, verifier may provide its own certificate to subject thus both parties play both roles in a protocol. In general, any device acting as an issuer, subject, and/or verifier in one instance and/or at one stage in a series of communications may act in any other role in another instance and/or stage.

With continued reference to FIG. 1, a digital certificate includes at least a digital signature signing elements of the certificate. A "digital signature," as used herein, includes a secure proof of possession of a secret by a signing device, as performed on provided element of data, known as a "message." A message may include an encrypted mathematical representation of a file or other set of data using the private key of a public key cryptographic system.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof may be implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Still referring to FIG. 1, secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key, which may serve as a verification datum in this context, and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, a digital signature may have one or more additional properties. A digital signature protocol may include a process for generation of anonymous signatures, where "anonymous" signatures are signatures that cannot be linked to and/or traced to a party signing such a signature. Signatures may alternatively or additionally be "unlinkable," meaning that two signatures may be produced based on the same originating secret and/or public key, where the two signatures are cannot be linked to each other; such signatures may, for instance, be produced as described in Non-provisional application Ser. No. 16/682,809, including using a chain of delegation, wherein each link is formed from a previous link my signing a subsequent message using a private key provided in the former link, and then converting private keys, public keys, and messages to anonymized forms that cannot be linked to the forms from which they were converted. Such a chain may be proven to validly issue from an origin point at a known public key and/or hardware root of trust, without revealing or rendering discoverable any identity of a device currently presenting a link and/or any intervening, linking devices.

Still referring to FIG. 1, a digital signature may include a Camenisch-Lysyanskaya (CL) signature. "CL signatures," as used herein, are digital signatures with additional cryptographic protocols; any signature protocol possessing the set of properties of a CL signature may be considered a CL signature. A CL signature, as used in this disclosure, has the following protocols: (1) Commit: a user and/or device may create a cryptographically hiding description of a secret value, such as a Pedersen Commitment, a hash, an encryption, or the like, collectively referred to for the purposes of this disclosure as a "commitment." Any person or device that and/or otherwise intercepts the commitment may be unable to learn and/or determine any information about the secret. (2) Issue: A user and/or user device may create a commitment to a secret value and sends it to an issuer. User and issuer may participate in an interactive protocol. At the end of the protocol, user may learn a signature on the secret value. Issuer may learn no information about the secret. (3) Prove: user and/or user device may create a commitment to a secret value and generate a proof, which may include any secure proof as described above, that the user and/or user device knows the signature. (4) Verify: a verifier, for instance as described in further detail below, may check validity of a proof that user/user device knows and/or possesses the signature on a committed value; the verifier may not learn the committed value or the signature. CL signatures may to create anonymous credentials. User and/or user device can create one randomized commitment during the Issue protocol and show a different randomized commitment during Prove protocol. Every output of Prove thus may be unlinkable even if the Issuer and Verifier are the same.

Further referring to FIG. 1, a digital signature may include a signature of knowledge, defined as a signature in which a secret used as a basis for a secure proof is knowledge and/or possession of any cryptographically hiding description of a secret key. For example, and without limitation, a cryptographic commitment (such as Pedersen Commitments or Fujisaki-Okamoto commitments) are a type of cryptographically hiding description of a secret key. Commitments may describe multiple secrets ($s1, s2, \ldots, sn$) at the same time; this description can be extended even further to include a statement about the properties of these secrets. For example, the description may indicate that some of the secret values are equal, not equal, less than, or greater than each other. In general, a cryptographic description may be a set of cryptographic commitments and a statement about the properties of the secret(s) inside the commitment(s). As a non-limiting example, zero-knowledge proofs as described above may be converted into signatures of knowledge. For instance, a Sigma protocol may be transformed into a signature of knowledge via a Fiat-Shamir transform. An exemplary process includes (1) Key Generation: a prover obtains some secret values and makes a statement about them. This statement (from the Sigma Statement function) is a cryptographically hiding description of the secret key. (2) Sign: a prover receives as input a message, the secret values and the statement. Prover generates the auxiliary information from the Sigma Send function. Then prover computes a cryptographic hash (e.g. SHA256, SHA3) of the message, the statement, and the auxiliary information. Prover uses the output of the hash function as a Sigma Challenge. Prover computes a Sigma Response function; the signature is the auxiliary information and the response. (3) Verify: a verifier receives as input statement, message, and output of Sign—the auxiliary information and the response. Verifier independently computes challenge using the same cryptographic hash function. Then verifier may use Sigma Verify function to check the signature.

Still referring to FIG. 1, any digital signature, private key, and/or public key as described above may be generated from a secret produced by and/or contained in a secure computing module 108 as described above, for instance using a key extractor circuit and/or a hardware and/or software module that generates a digital signature, key, or other datum called for in protocols as described above.

Further referring to FIG. 1, in addition to a signature, a digital certificate may include one or more other elements, including without limitation an issuer name, defined as a string of characters or bytes describing an identity of the issuer. An identifier may include, without limitation a pseudonymous and/or anonymous construction such as an "address" in cryptocurrency; for instance, an identifier may be linked to a public key of an issuer rather than identifying a particular device, person, or entity, which may include a verification datum produced using anonymized and/or unlinkable signatures and/or signature protocols, such that a chain of attestation to the verification datum and/or identifier may be verified and/or authenticated without revealing an identity of a particular device, person, and/or entity. A further element of a digital certificate may be an issuer key description, defined as an element of data identifiably linked to a private key or other secret used by issuing device 104 to generate digital signatures. Issuer key description may include a verification datum as described above, including without limitation a public key corresponding to a private key used for a digital signature, such as a digital signature signing digital certificate. Issuer key description may include a cryptographic commitment to a private key and/or other secret used to generate a digital signature, a hash of the private key and/or other secret, or any other description that does not reveal the secret key. A digital certificate may include a subject name, defined as a string of characters or bytes describing the identity of the recipient/subject device 132, where "identity" may have any definition and/or form described above. A digital certificate may include a subject secret key description, defined as a data element identifiably linked to a secret key and/or secret used to generate a digital signature, where the secret key and/or secret is possessed by the subject; this may be implemented in any manner suitable for implementation of an issuer key description. In a process of establishing a secure connection (e.g. TLS), an owner of the certificate, which may be subject, may demonstrate to the peer that the owner knows the subject secret key.

Still referring to FIG. 1, a certificate may include one or more attributes, which may be elements of data entered by an issuer such as issuing device 104 and may vary depending on choices and/or processes enacted by the issuer. An issuer may use such attributes, in a non-limiting example, to describe a subject, a level of authorization of a subject, or any other information to be conveyed in a digital certificate for use in authentication, authorization, or other processes in which the digital certificate plays a role. An attribute may, for instance, describe a role of a subject in an organization. Protocols such as TLS, SSL, SSH, or the like, may use certificates and/or tokens to authenticate one or both parties to a TCP connection to each other. For example, the term 'mTLS' (mutual TLS) may be used when both endpoints have certificates and are authenticated to each other). Certificates may have well defined formats such as X.509, SSL certificates, SSH certificates, SAML tokens, or OpenID Connect id_tokens. One or both parties to transactions involving digital certificates may also have an authorization layer that processes certificates and/or tokens to determine whether to permit communication. TLS is a secure communication protocol. To establish a mutually authenticated TLS session, two parties present X.509 certificates to each other. The X.509 certificates contain the public keys of each user. The X.509 certificate is typically signed by a trusted 3rd party. Users may also present chains of X.509 certificates where only the root signer needs to be trusted. Embodiments disclosed herein may establish anonymous authenticated TLS sessions where the participants cannot link subsequent sessions, even if the X.509 issuer is one of the participants; this may be accomplished without modifying TLS clients. OAuth is an authentication protocol that uses SAML tokens for single sign-on services, in which an identity provider registers with a service provider and gives the service provider a self-signed X.509 certificate; the service provider will then allow HTTP 156S connections from users that present a SAML token signed by the same public key as in the X.509 certificate. Service providers (websites) often run inside host environments (e.g. AWS) that perform the OAuth protocol, and simply give the service provider attributes inside the SAML token but do not reveal any information about the cryptographic keys used to create and authenticate the connection.

An issuer of a certificate may alternatively or additionally be referred to as a "certificate authority." A certificate authority in some embodiments may contain data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature. In some embodiments, a third party such as a certificate authority (CA) is available to verify that the possessor of the private key is a particular entity and/or is a valid recipient of a given credential; thus, if the certificate authority may be trusted, and the private key has not been stolen, the ability of an entity to produce a digital signature confirms the identity of the entity and links the file to the entity in a verifiable way. A digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature. Issuing device 104 may include a certificate authority; alternatively or additionally, issuing device 104 may be a part of a distributed certificate authority, for instance as described in Authorization tokens, credentials, and/or temporal attributes may be implemented, without limitation, as described in U.S. Nonprovisional application Ser. No. 16/680,787, filed on Nov. 12, 2019 and entitled SYSTEMS AND METHODS FOR DISTRIBUTED KEY STORAGE, the entirety of which is incorporated herein by.

Still referring to FIG. 1, first digital certificate 112 may include a first digital signature public and private key pair according to a first digital signature protocol; first digital signature protocol may include any digital signature protocol as described above. For instance, and without limitation, first digital signature protocol may include a protocol such as RSA, DSA, and/or ECDSA. First digital signature protocol may include a protocol usable by devices and/or systems that are not able to use a protocol used for a second signature protocol as described in further detail below. First private key 116 may include any key and/or secret that is usable to generate a digital signature according to first digital signature protocol, including without limitation a private key of a public key cryptographic system as described above. First public key 120 may include any verification datum suitable for verification of a digital signature according to first digital signature protocol, including without limitation a public key of a public key cryptographic system as described above. First public and private key pair may be generated using any suitable software and/or hardware process or module, as described above, including without limitation a secure computing module 108 of issuing device 104. Alternatively or additionally, first public and private key pair may be part of a chain of delegation of digital signatures and/or digital certificates from an upstream device 124. Upstream device 124 may delegate a signature, credential, and/or digital certificate to issuing device 104 according to any process and/or protocol for delegation as described herein. Upstream device 124 may act in a role of issuer, while issuing device 104 may act in a role of subject, in any process for issuing a digital certificate to issuing device 104, including without limitation any process as disclosed in this disclosure; first private key 116 and first public key 120 may be obtained from a digital certificate so issued to issuing device 104.

With continued reference to FIG. 1, first digital certificate 112 may include a second digital signature public key according to a second digital signature protocol. Second digital signature protocol may include any digital signature protocol as described above. Second digital signature protocol may be distinct from first digital signature protocol; for instance, and without limitation, first signature protocol may be a protocol that is not anonymizable and/or unlinkable as described above, while second signature protocol may be a protocol that is anonymizable and/or unlinkable as described above. As a further non-limiting example, first digital signature protocol may be an RSA, DSA, and/or ECDSA protocol, while second digital signature protocol may be a CL signature protocol and/or mercurial signature protocol. Second digital signature protocol may be included in an attribute field of first digital signature, and/or as an attribute thereof, as described above. In an embodiment, issuing device 104 may sign second public key 128 using first public key 120.

Still referring to FIG. 1, first certificate may include a third private key and/or third public key. Issuing device 104 may sign third public key with first public key 120. Third public key may include a public key possessed by subject device 132. Third public key may be received from subject device 132 and/or may be generated by a secure computing module 108 of subject device 132.

Still referring to FIG. 1, first digital certificate 112 may include one or more additional elements, which may, without limitation, be included as attributes and/or in an attribute field. One or more additional elements may include a credential conferring a confidence level, trust level, access right to one or more resources in a network and/or on one or more computing devices, authorization to perform one or more actions, endorsement of a degree to which subject device 132 implements suitable security protocols, or the like. Credential may include and/or be included in an authorization token, which may include an authorization token having a temporal attribute such as an expiration time, a period during which it is valid, or the like; authorization token may, for instance, be included in a lot of authorization tokens that have a shared epoch of validity after which revocation of the tokens may be inferred by devices evaluating authorization token and/or first digital certificate 112. Authorization tokens, credentials, and/or temporal attributes may be implemented, without limitation, as described in U.S. Nonprovisional application Ser. No. 16/680,787.

With continued reference to FIG. 1, system 100 may include a subject device 132. Subject device 132 may include, without limitation, any computing device suitable for use as issuing device 104 as described above. For instance, and without limitation, subject device 132 may include a secure computing module 108 as described above.

Still referring to FIG. 1, subject device 132 may be configured to generate a second digital certificate. Second digital certificate may include any digital certificate as described above, and/or any digital certificate generated according to protocols as described above. Generating second digital certificate may include generating a subject digital signature 140 signing the certificate. Subject digital signature 140 may be generated as a function of second digital signature protocol. Generating second digital signature as a function of second digital signature protocol may include enacting any process that produces second digital signature and is cryptographically linked to second digital signature protocol and/or second public key 128. For instance, and without limitation, generating subject digital signature 140 may include signing the credential with a second private key corresponding to the second public key 128; a second private key corresponding to the second public key 128 may include a private key and/or secret the use of which to generate a digital signature will produce a digital signature for which second public key 128 is a verification datum. For instance, and without limitation, where second digital signature protocol is a group key protocol and/or a protocol such as a CL signature or mercurial signature protocol that permits generation of multiple private keys distinct and/or mutually unlinkable private keys and/or secrets, a private key and/or secret verifiable using second public key 128 may be an element of a "private key space," of the second public key 128, defined for the purposes of this disclosure as a set of all possible private keys and/or secret data usable to produce digital signatures that may be verified by second public key 128 and/or usable to encrypt a plaintext to a ciphertext that may be decrypted by second public key 128.

With continued reference to FIG. 1, generating subject digital may alternatively or additionally include generating a commitment, which may include any commitment as described above, to a second private key in a private key space of second public key 128, generating a secure proof of opening the commitment, and signing the second digital certificate as a function of the secure proof, where the secure proof may include any secure proof as described above. In an embodiment, signing second digital certificate as a function of the secure proof may include generating a signature of knowledge using the secure proof and signing the second digital certificate with the signature of knowledge as defined above. Alternatively or additionally, subject device 132 may sign the second digital certificate as a function of the secure proof of opening the commitment by generating a signature of knowledge using the secure proof, signing a third public key using the signature of knowledge, and signing the second digital certificate with a third private key corresponding to the third public key; third public key and/or third private key may be implemented according to any digital signature protocol as described above. For instance, third private key and third public key may be implemented using a digital signature protocol, such as RSA, DSA, and/or ECDSA, that is usable by legacy devices and/or devices operating conventional digital certificate processes as described above.

Still referring to FIG. 1, subject device 132 may additionally sign second digital certificate with one or more additional signatures based on elements of first digital certificate 112 other than second public key 128. For instance, and without limitation, subject device 132 may sign second digital certificate using first private key 116. As a further non-limiting example, subject device 132 may sign second digital certificate using a third private key linked to first private key 116; for instance, where first certificate includes a third public key and/or verification datum signed using first private key 116, subject device 132 may sign second digital certificate using a third private key corresponding to the third public key, where signing may be accomplished using any digital signature protocol described above. Second digital certificate may further include second public key 128.

With continued reference to FIG. 1, subject device 132 may issue a third digital certificate 144 to a downstream subject 148 as a function of second certificate 136. Downstream subject 148 may include any device suitable for use as issuing device 104 and/or subject device 132; for instance, downstream subject 148 may include a secure computing module 108 or the like. Subject device 132 may delegate a signature, credential, and/or digital certificate to downstream subject 148 according to any process and/or protocol for delegation as described herein. Subject device 132 may act in a role of issuer, while downstream subject 148 may act in a role of subject, in any process for issuing a digital certificate to downstream subject 148, including without limitation any process as disclosed in this disclosure. Second digital certificate may function in the role of first digital certificate 112 in such a process; any public key included in and/or generated using second digital certificate may be used in the role of first public key 120, and any private key corresponding thereto may be used in the role of first private key 116. Generation of third digital certificate 144 may be accomplished using an identical embodiment of a process for generation of second digital certificate and/or first digital certificate 112 or may be performed using a different embodiment and/or variation thereof, including without limitation any variation and/or embodiment consistent with this disclosure.

Still referring to FIG. 1, subject device 132 may be configured to provide second digital certificate to a verifying device 152; subject device 132 may provide first digital certificate 112 to verifying device 152. Verifying device 152 may include any device suitable for use as issuing device 104 and/or subject device 132. Verifying device 152 may be configured to evaluate one or more signatures of first digital certificate 112 and/or second digital certificate. In an embodiment, verifying device 152 may verify association of issuer name, subject name, public keys, and/or verification data with issuing device 104, subject device 132, and/or devices, entities, and/or objects linked to issuer name, subject name, public keys, and/or verification data by one or more chains of attestation, signature chains, and/or chains formed by iterative generation of certificates using one or more processes and/or protocols described in this disclosure. Verifying device 152 may evaluate one or more digital signatures in first digital certificate 112 and/or second digital certificate; which digital signatures are evaluated by verifying device 152 may depend upon which digital signature protocols verifying device 152 is configured to perform.

As a non-limiting example, and still referring to FIG. 1, a verifying device 152 that is capable of performing evaluations according to both first signature protocol and second signature protocol may validate first digital certificate 112, for instance by recognizing a public key of issuing device, and/or chain therefrom to a recognized public key or identifier and evaluating check digital signature any digital signature formed using first public key 120 in first digital signature. Continuing the example, verifying device 152 may verify that both certificates have the same second public key 128 value, and validate signature formed as a function of second public key 128, for instance by validating secure proof of knowledge as described above and/or validating a signature signed with a private key corresponding to second public key 128. Further continuing the example, verifying device 152 may validate a third signature, where present.

As a further non-limiting example, where verifying device 152 is not configured to evaluate second signature, verifying device 152 may perform a modified validation and/or verification of signatures. For instance, verifying device 152 may validate second digital certificate as described above, including by validating any digital signature generated using first private key 116. Further continuing the example, verifying device 152 may verify that both digital certificates include the same second public key 128 value. Verifying device 152 may additionally validate third signature, where present. In an embodiment, and still continuing the example, verifying device 152 may have further verification steps as described above performed by a trusted third party, which may include any device suitable for use as issuing device 104 as described above, and may be configured to perform verification under second digital signature protocol.

Still referring to FIG. 1, embodiments of the disclosed invention may be better understood by reference to the following exemplary implementations. In a first exemplary implementation, issuing device 104 may create a first certificate on its CL signature public key as shown in the following table:

| Field | Value |
|---|---|
| Issuer | Issuing device's distinguished name. |
| Issuer Public Key | First public key: Issuing device's public key from a well-recognized signature scheme (e.g. RSA) |
| Subject | Issuing device's distinguished name |
| Subject Public Key | Arbitrary-may be the same as Issuer's Public Key. |
| Attribute 1: CL signature Public Key | second public key |
| Signature | The Issuing device may sign the certificate using a standard signature that can be verified using first public key |

Subject device 132 and Issuing device 104 may execute a CL signature Issue protocol: subject device 132 may choose a secret sk in CL signature message space. Subject device 132 may send the Issuing device 104 a cryptographic commitment C1=Commit(sk,r1); the commitment may contain other values v1, v2, . . . , vn that the issuing device 104 may also sign as part of issue. At the end of the protocol, subject device 132 may learn an output S, which is a valid signature on sk. Subject device 132 may also get first certificate.

Further continuing the above-described example, subject device 132 may create a self-signed certificate second certificate 136 using a fresh key-pair (SK$_P$, PK$_P$) for a standard signature scheme such as DSA, ECDSA, or RSA.

| Field | Value |
|---|---|
| Issuer | Issuing device's distinguished name. |
| Issuer Public Key | First public key |
| Subject | Same as Issuer or some other distinguished name |
| Subject Public Key | Same as Issuer, or another public key from a standard signature scheme. |
| Attribute 1: CL signature Public Key | Second public key |
| Attribute 2: CL signature Commitment | C2 = Commit(sk, r2). This commitment may be treated as a public key for the purposes of Attribute 4. |
| Attribute 3: CL signature Proof | This will be a CL signature proof that the subject device knows a valid signature on the opening of C2 under the public key second public key |
| Attribute 4: Anonymous Recertification | The public key PK$_P$ is signed via a signature of knowledge of the opening of C2. |
| Signature | The subject device may sign the certificate using a standard signature that can be verified using first public key. |

Subject device 132 may show first certificate and second certificate 136 to verifying device 152; alternatively, verifying device 152 may already have first certificate that it learned via another means.

Still referring to FIG. 1, and further continuing the above example, verification process may be performed by verifying device 152 as follows: verifying device 152 may receive first certificate and second certificate 136. Verifying device 152 may recognize issuing device 104 public key and validate first certificate as a standard certificate with a valid signature. Verifying device 152 may validate second certificate 136 as standard self-signed X.509 certificate with a valid signature. Verifying device 152 may check that first certificate and second certificate 136 may have the same value for CL signature Public Key second public key 128. Verifier may check that second certificate 136 attribute CL signature Proof is valid. Verifier may check that second certificate 136 attribute CL signature Recertification Proof is valid.

With continued reference to FIG. 1, in a second non-limiting illustrative example, implementation in which an explicitly linked certificate chain that can be verified by unmodified host environments, such as firewalls, network gateways, web service hosts—e.g. AWS, is illustrated. Issuing device 104 may generate a public and private keypair (PK$_X$, SK$_X$) from a standard signature scheme. Issuing device 104 may create first certificate as described in the previous example, only using PK$_X$ as the Subject Public Key:

| Field | Value |
|---|---|
| Issuer | Issuing device's distinguished name. |
| Issuer Public Key | Issuing device's public key from a well-recognized signature scheme (e.g. RSA) |
| Subject | Issuing device's distinguished name |
| Subject Public Key | PK$_X$ |
| Attribute 1: CL signature Public Key | second public key |
| Signature | Issuing device may sign the certificate using a standard signature that can be verified using first public key |

Issue protocol may proceed as in the first example. Issuing device 104 may reveal SK$_X$ to the subject device 132. For a show protocol, subject device 132 may create a certificate second certificate 136 using (SK$_X$, PK$_X$) for a standard signature scheme such as DSA, ECDSA, or RSA. The Subject Public Key may be a third key-pair (SK$_P$, PK$_P$) involving third public key as described above for a standard signature scheme such as DSA, ECDSA, or RSA, where second certificate 136 may contain elements as shown in the following table:

| Field | Value |
|---|---|
| Issuer | Issuing device's distinguished name. |
| Issuer Public Key | PK$_X$ |
| Subject | Same as Issuer or some other distinguished name |
| Subject Public Key | PK$_P$ |
| Attribute 1: CL signature Public Key | Second public key |
| Attribute 2: CL signature Commitment | C2 = Commit(sk, r2) |
| Attribute 3: CL signature Proof | CL signature proof that the subject device knows a valid signature on the opening of C2 under the public key second public key |
| Attribute 4: CL signature Recertification | The public key PK$_P$ is signed via a signature of knowledge of the opening of C2. |

| Field | Value |
| --- | --- |
| Proof Signature | The Participant will sign the certificate using a standard signature that can be verified using $PK_X$ |

Subject device 132 may show first certificate and second certificate 136 to verifying device 152. verifying device 152 may already have first certificate that it learned via another means.

With further reference to FIG. 1, and continuing the above example, verification may include receipt by verifying device 152 of first certificate and second certificate 136. Verifying device 152 may recognize issuing device 104 public key and validate first certificate as a standard certificate with a valid signature. Verifying device 152 may validate second certificate 136 as standard certificate (e.g. X.509 or SAML token) with a valid signature. Verifying device 152 may validate that second certificate 136 has an identical issuer and issuer public key as the subject (i.e., subject device 132) and subject public key in first certificate, thus validating the certificate chain. Verifying device 152 may check that first certificate and second certificate 136 have the same value for attribute: CL signature Public Key second public key 128. Verifying device 152 may check that second certificate 136 attribute CL signature Proof is valid. Verifier may check that second certificate 136 attribute CL signature Recertification Proof is valid.

In an embodiment, and still referring to FIG. 1, verification under the above example may be divided between two or more devices and/or groups thereof: a host environment and a service provider. A host environment may recognize issuing device 104's public key and validate first certificate as a standard certificate with a valid signature. Host environment may validate second certificate 136 as standard certificate (e.g. X.509 or SAML token) with a valid signature. Host environment may validate that second certificate 136 has the same Issuer and Issuer Public Key as the Subject and Subject Public Key in first certificate, thus validating the certificate chain. A service provider may check that first certificate and second certificate 136 have the same value for attribute: CL signature Public Key second public key 128, that the second certificate 136 attribute CL signature Proof is valid, and that the second certificate 136 attribute CL signature Recertification Proof is valid.

With continued reference to FIG. 1, in an additional illustrative example, for a security protocol such as OAuth or TLS that has a flexible crypto-suite of signature schemes recognized in the protocol, such as RSA, DSA, ECDSA, or the like, the security protocol may be augmented with a CL signature verification library and issuing device 104 and subject device 132 may move CL signature data from the attributes directly into the certificate fields. In such a scenario, issuing device 104 may issue first certificate, a self-signed certificate that places its CL signature public key second public key 128 into the Subject Public Key.

| Field | Value |
| --- | --- |
| Issuer | Issuing device's distinguished name. |
| Issuer Public Key/First public key 120 | Issuing device's public key from a well-recognized signature scheme e.g. RSA) |
| Subject | Issuing device's distinguished name |
| Subject Public | Second public key |
| Key Signature | Issuing device may sign certificate using a standard signature that can be verified using first public key |

Subject device 132 and Issuing device 104 may execute the same Issue protocol as in the first section. In a show protocol, subject device 132 may generate a fresh key-pair ($SK_P$, $PK_P$) for a standard signature scheme such as DSA, ECDSA, or RSA. Subject device 132 may create a second certificate 136 with $PK_P$ as the subject public key and place the CL signature proofs in the signature field:

| Field | Value |
| --- | --- |
| Issuer | Issuing device distinguished name. |
| Issuer Public Key | second public key |
| Subject | Same as issuer or some other distinguished name |
| Subject Public Key | $PK_P$ |
| Signature | All of the information in the custom attributes from second certificate in previous examples may be placed here:<br>1. CL signature Commitment: C2 = Commit(sk, r2).<br>2. CL signature Proof: CL signature proof that the subject device 132 knows a valid signature on the opening of C2 under the public key second public key 128<br>3. CL signature Recertification Proof: The public key $PK_P$ is signed via a signature of knowledge of the opening of C2. |

In a further non-limiting example, one or more of first digital certificate 112 and second digital certificate may be extended to include other attributes. A CL signature issue protocol may allow an issuer to sign multiple secret values at the same time. Thus, subject device 132 may choose to prove certain properties about these values to issuing device 104 prior to issue. For example, subject device 132 may prove that a particular secret value is equal to a name or group or is less than the current time+1 year. CL signature Commitment C2 may include multiple values that were signed during issue. Subject device 132 may choose to include in second certificate 136 any set of public attributes it chooses because the subject device 132 is the one to generate the signature on second certificate 136. These public attributes may include statements describing properties of secrets inside C2. For instance, issuer may give a CL signature on the name of a group to which subject device 132 belongs. Subject device 132 may create a public attribute revealing this group name. Subject device 132 may then append another attribute with a signature of knowledge proving that a signed secret value is equal to the group name. Certificates may include timestamps indicating when certificate is valid. Issuer may sign a timeout value as a hidden secret. Subject device 132 may insert a timestamp in an appropriate part of the certificate. Then, subject device 132 may add a signature of knowledge proving a hidden secret in C2 is less than or equal to public timestamp.

As a further example, and still referring to FIG. 1, participants often present Relying Parties with certificate chains. For instance, and as described above, issuing device 104 may have a certificate from another issuer such as upstream device 124, which may have a certificate from another issuer, and so forth. A certificate obtained by the subject device 132 may in this case be part of a chain of certificates. Subject device 132 may use this certificate to issue yet another certificate, for instance to downstream subject 148 as described above. Alternatively or additionally, a chain of credential delegation may be used. Delegatable credentials are a form of anonymous credentials as described above, such as without limitation mercurial signatures. Similar to a certificate chain, a receiver of a delegatable credential may issue credentials to the next device in the chain. This issuance protocol may be either interactive or non-interactive, depending on the implementation of delegatable credentials. A chain of delegatable anonymous credentials may be inserted into a certificate chain in two ways: (1) Each step in the delegation chain may be inserted as a stand-alone certificate; or (2) a receiver of the delegated credential may have enough information as part of a delegated credential to condense chain. Receiver may take a root certificate A, delete all intermediate certificates, and create a certificate B with cryptographic information representing delegated credential; the delegated credential may have the format of a CL signature, and may be inserted into the certificate using any of the techniques described above.

Figure 2:
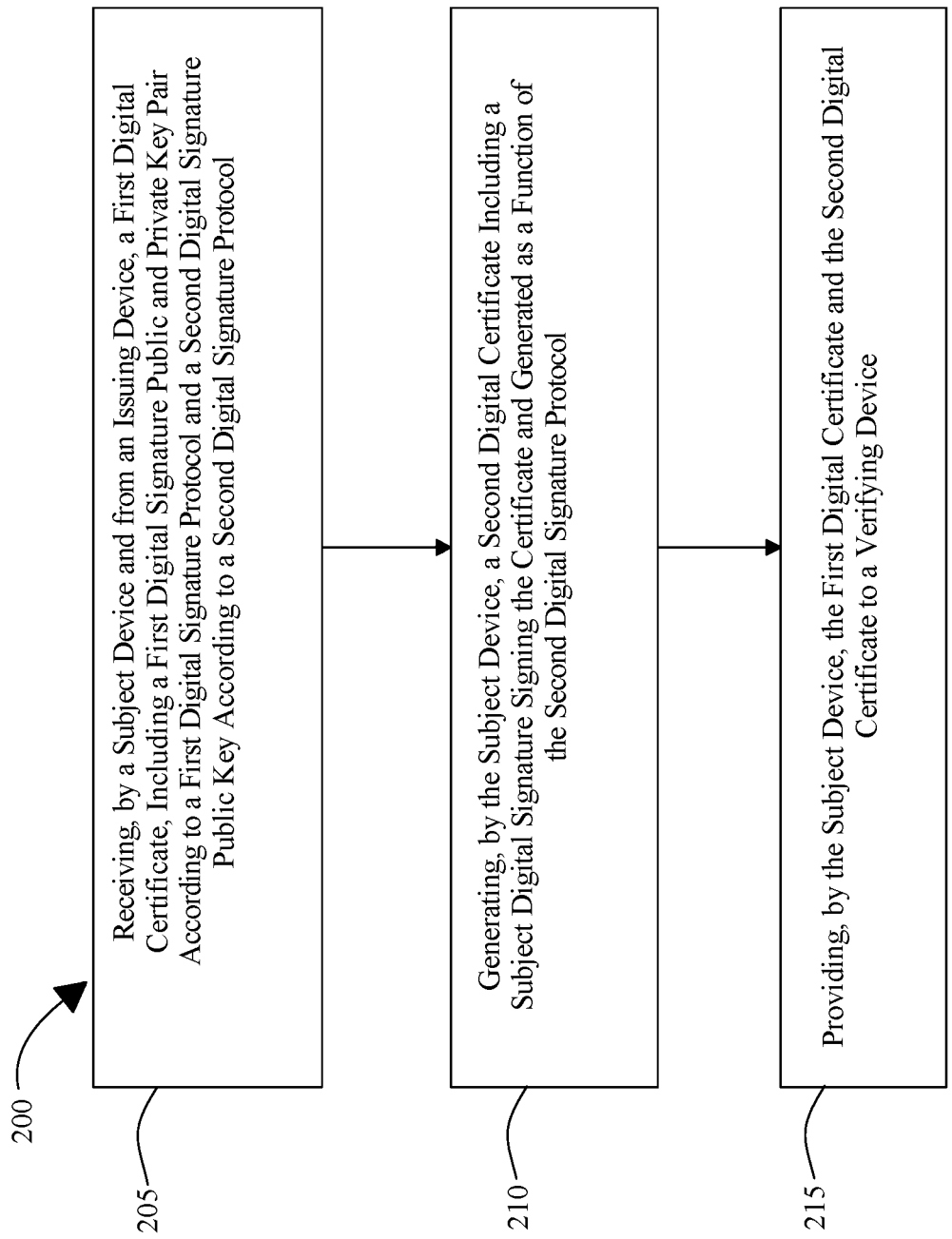
FIG. 2 is a flow diagram of a method of implementing mixed protocol certificates.

Referring now to FIG. 2, an exemplary embodiment of a method 200 of implementing mixed protocol certificates is illustrated. At step 205, a subject device 132 receives from an issuing device 104 a first digital certificate 112; this may be implemented, without limitation, as described above in reference to FIG. 1. First digital certificate 112 further includes a first digital signature public and private key pair according to a first digital signature protocol and a second digital signature public key according to a second digital signature protocol, wherein the second digital signature protocol is distinct from the first digital signature protocol. Second digital signature protocol may include an unlinkable digital signature protocol. Second public key 128 may be signed using the first public key 120.

At step 210, and with continued reference to FIG. 2, subject device 132 generates a second digital certificate; this may be implemented, without limitation, as described above in reference to FIG. 1. Generating second digital certificate includes generating a subject digital signature 140 signing the certificate, the subject digital signature 140 generated as a function of the second digital signature protocol. Generating subject digital signature 140 may include signing second digital certificate with a second private key corresponding to the second public key 128. Generating subject digital signature 140 may include generating a commitment to a second private key in a private key space of the second public key 128, generating a secure proof of opening the commitment, and signing the second digital certificate as a function of the secure proof. Signing second digital certificate as a function of secure proof may include generating a signature of knowledge using the secure proof and signing the second digital certificate with the signature of knowledge. Signing second digital certificate as a function of secure proof may include generating a signature of knowledge using the secure proof, signing a third public key using the signature of knowledge, and signing the second digital certificate with a third private key corresponding to the third public key.

Still referring to FIG. 2, generating second digital certificate may include signing the certificate with the first private key 116. Where first certificate includes a signature signing a third public key with the first private key 116, generating the second digital certificate may further include signing the certificate with a third private key corresponding to the third public key.

At step 215, and further referring to FIG. 2, subject device 132 provides the first digital certificate 112 and the second digital certificate to a verifying device 152; this may be implemented, without limitation, as described above in reference to FIG. 1. Subject device 132 may issue a third digital certificate 144 to a downstream subject 148 as a function of the second digital certificate, for instance as described above in reference to FIG. 1.

Figure 3:
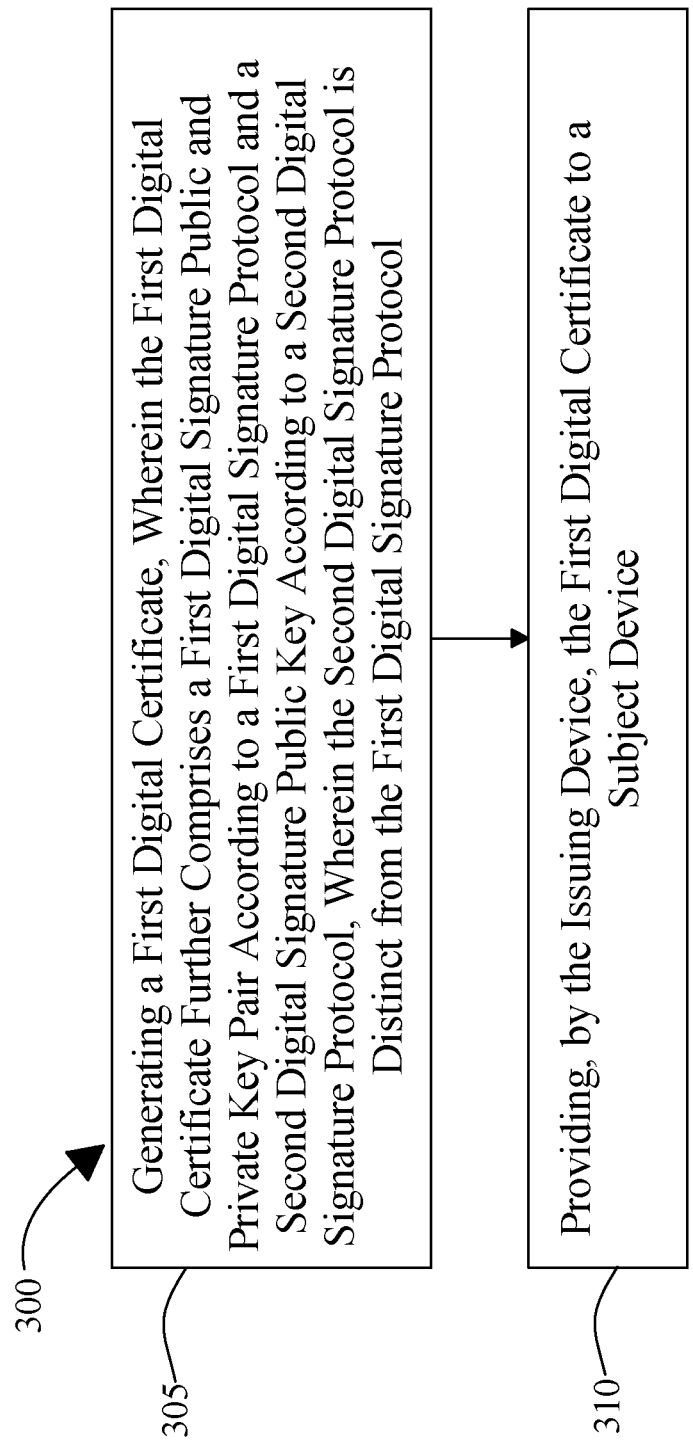
FIG. 3 is a flow diagram of a method of implementing mixed protocol certificates.

Referring now to FIG. 3, an exemplary embodiment of a method 300 of implementing mixed protocol certificates is illustrated. At step 305, an issuing device 104 generates a first digital certificate 112; this may be implemented, without limitation, as described above in reference to FIG. 1. First digital certificate 112 includes a first digital signature public and private key pair according to a first digital signature protocol. First digital certificate 112 includes a second digital signature public key according to a second digital signature protocol, wherein the second digital signature protocol is distinct from the first digital signature protocol. At step 310, issuing device 104 provides first digital certificate 112 to a subject device 132; this may be implemented, without limitation, as described above in reference to FIG. 1.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 4:
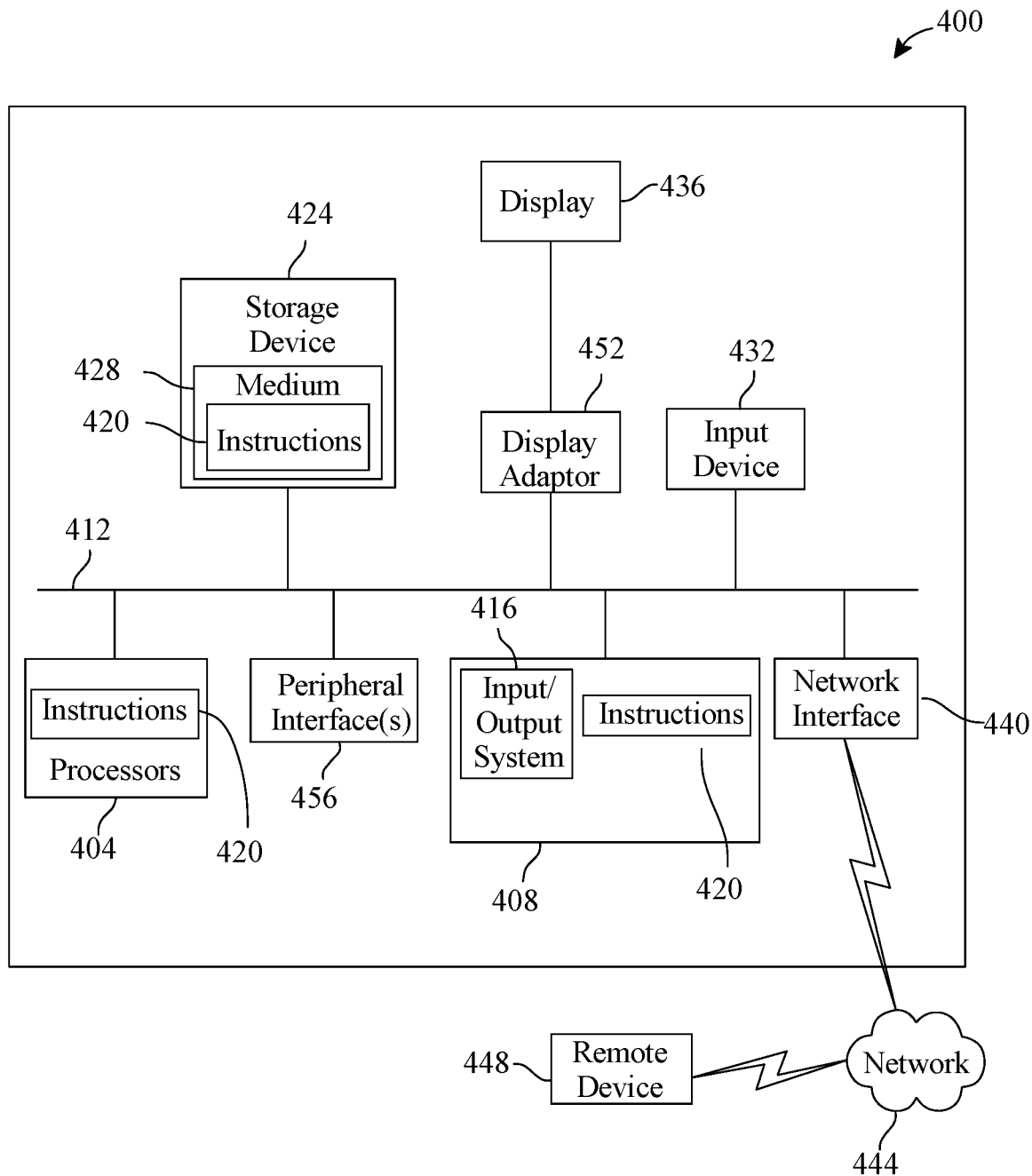
FIG. 4 is a block diagram of a computing system that can be used to implement any one or more of the methodologies disclosed herein and any one or more portions thereof.

FIG. 4 shows a diagrammatic representation of one embodiment of a computing device in the exemplary form of a computer system 400 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 400 includes a processor 404 and a memory 408 that communicate with each other, and with other components, via a bus 412. Bus 412 may include any of several types of bus structures including, but not limited to, a memory bus, a memory controller, a peripheral bus, a local bus, and any combinations thereof, using any of a variety of bus architectures.

Processor 404 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 404 may be organized according to Von Neumann and/or Harvard architecture as a non-limiting example. Processor 404 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 408 may include various components (e.g., machine-readable media) including, but not limited to, a random-access memory component, a read only component, and any combinations thereof. In one example, a basic input/output system 416 (BIOS), including basic routines that help to transfer information between elements within computer system 400, such as during start-up, may be stored in memory 408. Memory 408 may also include (e.g., stored on one or more machine-readable media) instructions (e.g., software) 420 embodying any one or more of the aspects and/or methodologies of the present disclosure. In another example, memory 408 may further include any number of program modules including, but not limited to, an operating system, one or more application programs, other program modules, program data, and any combinations thereof.

Computer system 400 may also include a storage device 424. Examples of a storage device (e.g., storage device 424) include, but are not limited to, a hard disk drive, a magnetic disk drive, an optical disc drive in combination with an optical medium, a solid-state memory device, and any combinations thereof. Storage device 424 may be connected to bus 412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 424 (or one or more components thereof) may be removably interfaced with computer system 400 (e.g., via an external port connector (not shown)). Particularly, storage device 424 and an associated machine-readable medium 428 may provide nonvolatile and/or volatile storage of machine-readable instructions, data structures, program modules, and/or other data for computer system 400. In one example, software 420 may reside, completely or partially, within machine-readable medium 428. In another example, software 420 may reside, completely or partially, within processor 404.

Computer system 400 may also include an input device 432. In one example, a user of computer system 400 may enter commands and/or other information into computer system 400 via input device 432. Examples of an input device 432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 432 may be interfaced to bus 412 via any of a variety of interfaces (not shown) including, but not limited to, a serial interface, a parallel interface, a game port, a USB interface, a FIREWIRE interface, a direct interface to bus 412, and any combinations thereof. Input device 432 may include a touch screen interface that may be a part of or separate from display 436, discussed further below. Input device 432 may be utilized as a user selection device for selecting one or more graphical representations in a graphical interface as described above.

A user may also input commands and/or other information to computer system 400 via storage device 424 (e.g., a removable disk drive, a flash drive, etc.) and/or network interface device 440. A network interface device, such as network interface device 440, may be utilized for connecting computer system 400 to one or more of a variety of networks, such as network 444, and one or more remote devices 448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 444, may employ a wired and/or a wireless mode of communication. In general, any network topology may be used. Information (e.g., data, software 420, etc.) may be communicated to and/or from computer system 400 via network interface device 440.

Computer system 400 may further include a video display adapter 452 for communicating a displayable image to a display device, such as display device 436. Examples of a display device include, but are not limited to, a liquid crystal display (LCD), a cathode ray tube (CRT), a plasma display, a light emitting diode (LED) display, and any combinations thereof. Display adapter 452 and display device 436 may be utilized in combination with processor 404 to provide graphical representations of aspects of the present disclosure. In addition to a display device, computer system 400 may include one or more other peripheral output devices including, but not limited to, an audio speaker, a printer, and any combinations thereof. Such peripheral output devices may be connected to bus 412 via a peripheral interface 456. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for implementing mixed protocol certificates, the system comprising a subject device, the subject device designed and configured to:
   receive, from an issuing device, a first digital certificate, wherein the first digital certificate further comprises:
      a first digital signature public and private key pair according to a first digital signature protocol; and
      a second digital signature public key according to a second digital signature protocol, wherein the second digital signature protocol is distinct from the first digital signature protocol;
   generate a second digital certificate, wherein generating the second digital certificate comprises generating a subject digital signature signing the certificate, the subject digital signature generated as a function of the second digital signature protocol, wherein signing the second digital signature further comprises:
      generating a signature of knowledge using a secure proof;
      signing a third public key using the signature of knowledge; and
      signing the second digital certificate with a third private key corresponding to the third public key; and
   provide the first digital certificate and the second digital certificate to a verifying device.

2. The system of claim 1, wherein the second digital signature protocol includes an unlinkable digital signature protocol.

3. The system of claim 1, wherein the second public key is signed using the first public key.

4. The system of claim 1, wherein generating the subject digital signature further comprises signing the credential with a second private key corresponding to the second public key.

5. The system of claim 1, wherein generating the subject digital signature further comprises:
   generating a commitment to a second private key in a private key space of the second public key;
   generating the secure proof, wherein the secure proof further comprises a secure proof of opening the commitment; and
   signing the second digital certificate as a function of the secure proof.

6. The system of claim 5, wherein signing the second digital certificate as a function of the secure proof further comprises:
   generating a signature of knowledge using the secure proof; and
   signing the second digital certificate with the signature of knowledge.

7. The system of claim 1, wherein generating the second digital certificate further comprises signing the certificate with the first private key.

8. The system of claim 1, wherein:
   the first certificate further comprises a signature signing a third public key with the first private key; and
   generating the second digital certificate further comprises signing the certificate with a third private key corresponding to the third public key.

9. The system of claim 1 further comprising issuing a third digital certificate to a downstream subject as a function of the second digital certificate.

10. A method of implementing mixed protocol certificates, the method comprising:
   receiving, by a subject device and from an issuing device, a first digital certificate, wherein the first digital certificate further comprises:
      a first digital signature public and private key pair according to a first digital signature protocol; and
      a second digital signature public key according to a second digital signature protocol, wherein the second digital signature protocol is distinct from the first digital signature protocol;
   generating, by the subject device, a second digital certificate, wherein generating the second digital certificate comprises generating a subject digital signature signing the certificate, the subject digital signature generated as a function of the second digital signature protocol, wherein signing the second digital signature further comprises:
      generating a signature of knowledge using a secure proof;
      signing a third public key using the signature of knowledge; and
      signing the second digital certificate with a third private key corresponding to the third public key; and
   providing, by the subject device, the first digital certificate and the second digital certificate to a verifying device.

11. The method of claim 10, wherein the second digital signature protocol includes an unlinkable digital signature protocol.

12. The method of claim 10, wherein the second public key is signed using the first public key.

13. The method of claim 10, wherein generating the subject digital signature further comprises signing the second digital certificate with a second private key corresponding to the second public key.

14. The method of claim 10, wherein generating the subject digital signature further comprises:
- generating a commitment to a second private key in a private key space of the second public key;
- generating the secure proof, wherein the secure proof further comprises a secure proof of opening the commitment; and
- signing the second digital certificate as a function of the secure proof.

15. The method of claim 14, wherein signing the second digital certificate as a function of the secure proof further comprises:
- generating a signature of knowledge using the secure proof; and
- signing the second digital certificate with the signature of knowledge.

16. The method of claim 10, wherein generating the second digital certificate further comprises signing the certificate with the first private key.

17. The method of claim 10, wherein:
- the first certificate further comprises a signature signing a third public key with the first private key; and
- generating the second digital certificate further comprises signing the certificate with a third private key corresponding to the third public key.

18. The method of claim 10 further comprising issuing a third digital certificate to a downstream subject as a function of the second digital certificate.

* * * * *